(12) United States Patent
Sureka et al.

(10) Patent No.: US 11,842,349 B1
(45) Date of Patent: *Dec. 12, 2023

(54) MULTIFACTOR AUTHENTICATION SYSTEMS AND METHODS

(71) Applicant: CITICORP CREDIT SERVICES, INC. (USA), Long Island City, NY (US)

(72) Inventors: Ashutosh Sureka, Coppell, TX (US); Rajesh Mondkar, Jacksonville, FL (US); Sathish Nandagopal, St. Johns, FL (US)

(73) Assignee: CITICORP CREDIT SERVICES, INC. (USA), Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,816

(22) Filed: Feb. 13, 2023

Related U.S. Application Data

(63) Continuation of application No. 15/830,289, filed on Dec. 4, 2017, now Pat. No. 11,605,083.

(51) Int. Cl.
  *G06Q 20/40* (2012.01)
  *H04L 9/40* (2022.01)
  (Continued)

(52) U.S. Cl.
  CPC ............. *G06Q 20/40145* (2013.01); *G06Q 20/3223* (2013.01); *H04L 63/083* (2013.01);
  (Continued)

(58) Field of Classification Search
  CPC ......... G06Q 20/40145; G06Q 20/3223; G06Q 20/351; G06Q 20/36; H04L 63/0861; H04L 63/083; H04L 2463/082; H04L 2463/102
  See application file for complete search history.

(56) References Cited

U.S. PATENT DOCUMENTS

| | | | |
|---|---|---|---|
| 7,810,722 B2 | 10/2010 | Dodson | |
| 7,987,501 B2 | 7/2011 | Miller et al. | |
| 11,010,763 B1 | 5/2021 | Fillinger | |
| 2004/0032083 A1 | 2/2004 | Walker et al. | |

(Continued)

OTHER PUBLICATIONS

Office Action for U.S. Appl. No. 15/830,289, dated Jan. 23, 2020, 13 pages.
Final Office Action for U.S. Appl. No. 15/830,289, dated Jul. 16, 2021, 21 pages.

(Continued)

*Primary Examiner* — Elda G Milef
(74) *Attorney, Agent, or Firm* — Johnson, Marcou, Isaacs & Nix, LLC; George Marcou; Scott A. Hendrix

(57) ABSTRACT

Multifactor authentication systems and methods employ an online payment server processor that authenticates a user in an online session with a merchant website server processor based on data representing one or more predefined authentication factors received from a user device processor over a communication network and sends data representing a secure user login cookie to the user device processor over the communication network based on the authentication of the user in the online session with the merchant website server processor. Thereafter, the online payment server processor authenticates the user in a subsequent online session with the merchant website server processor based in part on identifying the data representing the secure user login cookie on the user device and in part on data representing a second predefined authentication factor received from the user device processor over the communication network.

20 Claims, 2 Drawing Sheets

(51) Int. Cl.
  *G06Q 20/32* (2012.01)
  *G06Q 20/34* (2012.01)
  *G06Q 20/36* (2012.01)

(52) U.S. Cl.
  CPC ....... *H04L 63/0861* (2013.01); *G06Q 20/351* (2013.01); *G06Q 20/36* (2013.01); *H04L 2463/082* (2013.01); *H04L 2463/102* (2013.01)

(56) References Cited

U.S. PATENT DOCUMENTS

| | | |
|---|---|---|
| 2007/0136573 A1 | 6/2007 | Steinberg |
| 2009/0288012 A1 | 11/2009 | Hertel et al. |
| 2012/0323717 A1 | 12/2012 | Kirsch |
| 2014/0316981 A1 | 10/2014 | Muthukrishnan et al. |
| 2017/0357976 A1 | 12/2017 | Malik et al. |
| 2019/0066089 A1 | 2/2019 | Miryala et al. |

OTHER PUBLICATIONS

Office Action for U.S. Appl. No. 15/830,289, dated Jan. 26, 2021, 18 pages.
Office Action for U.S. Appl. No. 15/830,289, dated Nov. 18, 2021, 26 pages.
Final Office Action for U.S. Appl. No. 15/830,289, dated Mar. 11, 2022, 27 pages.
Non-Final Office Action for U.S. Appl. No. 15/830,289, dated Jun. 16, 2022, 28 pages.
Final Office Action for U.S. Appl. No. 15/830,289, dated Jul. 22, 2020, 16 pages.
"How to Use Web Cookies with E-Commerce Websites", UniBui's Money Blog, Jul. 30, 2016, 8 pages.
"Web Security Essentials—Session and Cookies", Jan. 8, 2017, 6 pages.
"What is a Cookie and Why is it Important?", big commerce.com, Nov. 28, 2017, 3 pages.
Tiwari, et al., "A Multi-Factor Security Protocol for Wireless Payment—Secure Web Authentication Using Mobile Devises", Nov. 13, 2011, 8 pages.

MULTIFACTOR AUTHENTICATION SYSTEMS AND METHODS

CROSS REFERENCE TO RELATED APPLICATIONS

This application claims priority to and is a continuation of co-pending U.S. patent application Ser. No. 15/830,289 filed Dec. 4, 2017, entitled "Multifactor Authentication Systems and Methods", the entire contents of which are hereby expressly incorporated herein by this reference including, without limitation, the specification, claims, and abstract, as well as any figures, tables, or drawings thereof.

FIELD OF THE INVENTION

The present invention relates generally to the field of authentication, and more particularly to systems and methods for multifactor identification and/or authentication of digital channel users.

BACKGROUND OF THE INVENTION

Currently, web checkout generally begins and ends on the web. For example, a user shopping on a merchant's website may select one or more items for placement into a virtual shopping cart. When the user elects to check out, the user may select a web checkout payment application, such as a digital wallet pre-filled with payment and shipping information. Once the user clicks on a selection of the web checkout payment application, currently the user may be prompted to log onto the online server of a financial institution with the user's financial institution online credentials, such as a user ID and password.

Currently, web checkout may typically be accessed by a user with two-factor authentication while the user remains on the merchant website attempting to purchase a product, which requires the user to proceed through the entire checkout processing flow on the merchant website. For example, once the user logs in to the financial institution online server with the user's credentials, based on a pre-determined level of transaction risk, the process may be interdicted for additional authentication. For example, at that point, the user may be prompted by a message sent to the user's device for entry of one or more additional pieces of evidence of the user's ID as a second authentication factor.

One such additional form of authentication may involve, for example, requiring the user to answer one or more questions based on personal information furnished by the user when the user initially registers his or her user ID and password. For example, the user's private information may include the user's responses to questions about the user's personal life, such as the name of the street on which the user lived when in a certain grade or the name of the user's first pet or best friend.

This legacy type of additional authentication is prone to error, for example, when a user forgets the information he or she previously furnished at the time the user initially registered his or her user ID and password. Moreover, fraudsters may be able to easily guess the answers to some commonly used, predictable questions or they may be able to discover the answers to such questions via performing a web search. Moreover, the legacy type of additional authentication involving multi-function authentication interdiction is relatively complicated and time consuming.

There is a present need for authentication systems and methods that overcome the deficiencies of these legacy systems. The problem that is solved by embodiments of the invention is rooted in technological limitations of the legacy approaches, and improved techniques and, in particular, improved applications of technology are needed to address the problems of such currently employed mechanisms. More specifically, the technologies applied in the aforementioned legacy approaches fail to achieve the sought-after capabilities of the herein-disclosed authentication systems and methods.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

SUMMARY OF THE INVENTION

Embodiments of the invention advance the technical fields for addressing problems associated with the above described currently employed mechanisms for multifactor identification and/or authentication of digital channel users as well as advancing peripheral technical fields. Such embodiments are directed to technological solutions that may involve systems that include, for example, an online payment server processor coupled to memory and programmed, for example, to authenticate a user in an online session with a merchant website server processor based on data representing one or more predefined authentication factors received from a user device processor over a communication network; to send data representing a secure user login cookie to the user device processor over the communication network based on authentication of the user in said online session with the merchant website server processor; and to authenticate the user in a subsequent online session with the merchant web site server processor based in part on identifying the data representing the secure user login cookie on the user device and in part on data representing a second predefined authentication factor received from the user device processor over the communication network. It is to be understood that all references to "communication network" herein shall be deemed to include any one or more suitable media networks through which a message may be transmitted to its intended recipient.

In embodiments of the invention, the online payment server processor may be further programmed, for example, to authenticate the user in said online session with the merchant website server processor based on data representing the one or more predefined authentication factors comprising data representing at least one of a user identifier and a user password received from the user device processor over the communication network. The online payment server processor may also be programmed, for example, to authenticate the user in said online session with the merchant website server processor based on data representing the one or more predefined authentication factor comprising both data representing a user identifier and data representing a user password.

In such systems for embodiments of the invention, the online payment server processor may be further programmed, for example, to send the data representing the secure login cookie to the user device processor when no data representing a secure user login cookie is already available on the user device. In further embodiments, the online payment server processor may be programmed, for example, to send the data representing the secure login cookie to the user device processor when no data representing a secure user login cookie is already available on the user device and a mobile payment application program is present on the user's mobile device. The online payment server processor may be additionally programmed, for example, to send the data representing the secure login cookie to the user device processor responsive to receiving data representing a request for faster checkout via the user device processor.

In other embodiments of the invention, the online payment server processor may be further programmed to write data representing the secure login cookie responsive to receiving data representing a request for faster checkout via the user device processor. In embodiments of the invention, the online payment server processor may be further programmed, for example, to send a push notification to the user device processor consisting at least in part of data representing a user transaction in the subsequent online session with the merchant website server processor.

Additional embodiments of the invention may involve, for example, the user device processor programmed to launch a mobile payment application program on the user's mobile device responsive to receiving the push notification consisting at least in part of data representing the user transaction in the subsequent online session with the merchant website server processor. In other embodiments, the user device processor may be further programmed, for example, to display the data representing the user transaction in the subsequent online session with the merchant website server processor together with additional data representing a user card, a user address, and a prompt for entry of a user authorization on the user device.

In additional embodiments of the invention, the online payment server processor may be further programmed, for example, to authenticate the user in the subsequent online session with the merchant website server processor based in part on the second predefined authentication factor comprising user biometric data received from the user device processor over the communication network. In other embodiments, the online payment server processor may be further programmed, for example, to authenticate the user in the subsequent online session with the merchant website server processor based in part on the data representing the second predefined authentication factor comprising user biometric data consisting of at least one of user fingerprint data, user voice recognition data, and user facial recognition data.

In additional embodiments of the invention, the online payment server processor may be further programmed, for example, to authenticate the user in the subsequent online session with the merchant website server processor based in part on the data representing the second predefined authentication factor comprising a user personal identifier received from the user device processor over the communication network. In still other embodiments, the online payment server processor may be further programmed, for example, to send data representing a user card and user address for a user transaction in the subsequent online session with the merchant website server processor based on authentication of the user in the subsequent online session.

Embodiments of the invention employ computer hardware and software, including, without limitation, one or more processors coupled to memory and non-transitory computer-readable storage media with one or more executable programs stored thereon which instruct the one or more processors to perform methods involving, for example, authenticating, by an online payment server processor coupled to memory, a user in an online session with a merchant website server processor based on data representing one or more predefined authentication factor received from a user device processor over a communication network; sending, by the online payment server processor, data representing a secure user login cookie to the user device processor over the communication network based on authentication of the user in said online session with the merchant website server processor; and authenticating, by the online payment server processor, the user in a subsequent online session with the merchant website server processor based in part on identifying the data representing the secure user login cookie on the user device and in part on data representing a second predefined authentication factor received from the user device processor over the communication network In further embodiments of the invention, authenticating the user in said online session with the merchant website server processor based on the data representing the at least one predefined authentication factor may involve, for example, authenticating the user in the online session with the merchant web site server processor based on data representing at least one of a user identifier and a user password received from the user device processor over the communication network. In other embodiments, sending the data representing the secure user login cookie to the user device processor may involve, for example, sending the data representing the secure login cookie to the user device processor when no data representing a secure user login cookie is already available on the user device.

In additional embodiments of the invention, authenticating the user in the subsequent online session with the merchant website server processor may involve, for example, sending a push notification to the user device processor consisting at least in part of data representing a user transaction in the subsequent online session with the merchant website server processor. In other embodiments, authenticating the user in the subsequent online session with the merchant website server processor based in part on the data representing the second predefined authentication factor may involve, for example, authenticating the user in the subsequent online session with the merchant website server processor based in part on user biometric data received from the user device processor over the communication network. Still other embodiments may involve, for example, sending, by the online payment server processor, data representing a user card and a user address for a user transaction in the subsequent online session on the merchant website server processor based on authentication of the user in the subsequent online session with the merchant website server processor.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention simplify checkout data flow in a transaction originating on the web and ending on the web, while assuring secure authentication that is driven, for example, through biometrics and/or a mobile communication device. Thus, embodiments of the invention reduce the steps in checkout data flow and minimize multi-function authentication interdiction data flow while increasing the security of checkout processing.

Figure 1:
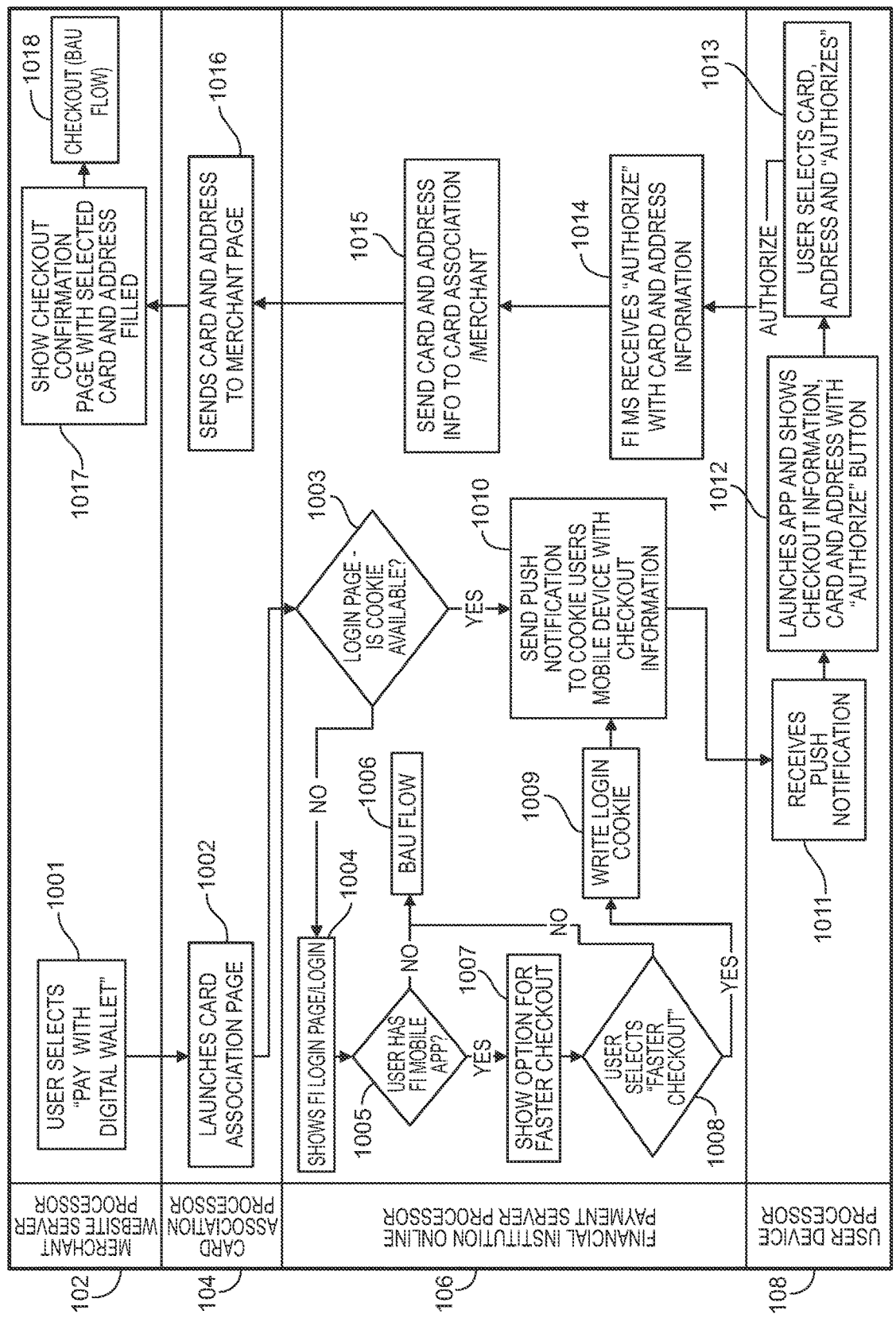
FIG. 1 is a schematic diagram that illustrates an overview example of components and flow of information between components for embodiments of the invention.

FIG. 1 is a schematic diagram that illustrates an example of key components and flow of information between such components of systems and methods for embodiments of the invention. Referring to FIG. 1, embodiments of the invention may employ, for example, a merchant website server processor 102, a card association processor 104, a financial institution online payment server processor 106, and the user's device processor 108, which may be communicatively coupled to one another via one or more communication networks.

In embodiments of the invention, when a user attempts to make a purchase on a web channel of a merchant 102 and enters the checkout phase, a notification may be sent to the processor of the user's device 108. The notification for embodiments of the invention may pop up, for example, via a mobile application on the processor of the user's device 108, such as a financial institution's online banking application or mobile payment application on the user's device.

In embodiments of the invention, the user may be prompted, for example, by the mobile payment application on the user's device 108 to perform a biometric identification, such as by fingerprint, voice or facial recognition or any other suitable biometric identification. In the event the user has a mobile device that is not enabled for biometric data capture, the user may be prompted, for example, by the mobile payment application to enter a secure PIN to approve and authenticate the transaction on the mobile device.

Once the user is authenticated and the transaction is approved by the user, the authorized and approved transaction information may be sent from the user's mobile device 108 to the merchant's website processor 102. Thus, in embodiments of the invention, a user on a web channel may be identified and verified and the transaction may be authorized via a mobile channel, for example, through a fingerprint scan, voice approval, or facial recognition, or through a personal identification number (PIN) if biometric data capture is not available on the user's device 108.

The notification for embodiments of the invention may be sent, for example, as a text message to a processor of the mobile device 108 by a financial institution online payment server processor 106. As noted, embodiments of the invention thus reduce the current steps in checkout data flow and minimize multi-function authentication interdiction data flow while increasing the security of checkout processing.

In a first-time user aspect for embodiments of the invention, the first-time user may select items for a virtual shopping cart on a merchant's website 102, click on a "checkout" icon, and then select a financial institution's online payment application for payment. The user may then be prompted to login to the financial institution's online payment server processor 106 with the user's login credentials. In response to a successful login by the user, the financial institution's online payment server processor 106 may create and send a secure login cookie, as well as a notification message, to the user's device processor 108.

When the notification is received by the user's device processor 108 from the online payment server processor 106, the user may perform, for example, a fingerprint authorization on the user's biometric data capture-enabled device 108 in response to a prompt. Responsive to entry of the fingerprint authorization, the user's authorization may be sent with the user's card and address information to the merchant processor 102 via the financial institution's online payment server processor 106 and card association processor 104.

Thereafter, when the same user shops on the same merchant's website 102 and wishes to check out, the user may click on a selection of the web checkout payment application, responsive to which the online payment server processor 106 may identify the user's mobile device 108 based on the secure login cookie previously sent to the user's mobile device 108. Thus, the online payment server processor 106 may by-pass the requirement to log in to the financial institution's online payment server processor 106 with the user's credentials. Instead, the authentication is performed, for example, by the online payment server processor 106 sending a push notification to the user's mobile device processor 108 and receiving the user's authorization via the user's biometric authentication on the mobile application on the user's mobile device 108.

In embodiments of the invention, the secure login cookie is therefore a first authentication factor that identifies the user's mobile device 108 as the mobile device of a user who has already performed a checkout on the same merchant website 102 using the user's financial institution online credentials, such as a user ID and password, to log in to the financial institution online server 106. When the financial institution online server processor 106 sends the push notification to the user's mobile device processor 108, an application for embodiments of the invention is launched on the user's mobile device that displays the checkout information and the user's card and address information with a prompt for the user to enter an authorization via a biometric identifier, such as the user's fingerprint as a second authentication factor. Alternatively, if the user's mobile device 108 is not enabled for biometric data capture, the user may be prompted, for example, by the mobile payment application to enter a secure PIN to approve and authenticate the transaction.

Referring further to FIG. 1, a user employing a user's browser application may access the merchant's website server processor 102 to purchase goods or services. At 1001, when the user decides to check out, the user may select an option to pay via a card association digital wallet application on the user's mobile device 108. At 1002, responsive to receiving entry of the selection to pay via the card association digital wallet application, a card association web page may be displayed by the card association processor 104, and in turn, at 1003, a login page of the financial institution online payment processor 106 may be displayed on the user's device. In addition, at 1003, the financial institution online payment system processor 106 may query whether or not a secure login cookie is already available for the user, for example, on the browser application of the user device 108.

Referring again to FIG. 1, if it is determined at 1003 that a secure login cookie is not already available for the user (e.g., first time user), at 1004, the financial institution (also referred to as "FI" in FIG. 1) online payment system processor 106 may display a login page with a prompt for the user to log in with the user's credentials. Thereafter, at 1005, in response to receiving the user's login and authenticating the user via the user's credentials, the financial institution online payment system processor 106 may query whether or not a financial institution mobile payment application is available for the user on the user's mobile device 108. If, at 1005, a financial institution mobile payment application is not available for the user on the user's mobile device 108, at 1006, the process may continue to pre-existing payment processing channels.

Referring once again to FIG. 1, alternatively, at 1005, if a financial institution mobile payment application is available for the user on the user's device, at 1007, the financial institution online payment system processor 106 may display a prompt for the user to select an option for a faster checkout. If, at 1008, the user declines the option for faster checkout, the process may likewise continue to pre-existing payment processing channels or "business as usual" (also referred to as "BAU") at 1006. Alternatively, at 1008, if the user selects the option for faster checkout, at 1009, the financial institution online payment system processor 106 may create and send a secure login cookie to the user's device 108.

Referring once more to FIG. 1, if it is determined at 1003 that a secure login cookie is already available for the user on the user's device 108, or if, at 1009, the financial institution online payment system processor 106 creates and sends a secure login cookie to the user's device, at 1010, the financial institution online payment system processor 106 may send a push notification to the user's mobile device processor 108 with checkout information. Thereafter, responsive to receiving the push notification by the user's device processor 108 at 1011, the user's device processor may launch the financial institution mobile payment application at 1012 and display checkout information with the user's card and address information and prompt the user to select an authorize option.

Referring still further to FIG. 1, at 1013, in response to receiving the entry of the user's selection of the authorize option, the user's mobile device processor 108 may return an authorize message with the user's card and address information to the financial institution online payment system processor 106. Thereafter, upon receiving the authorize message with the user's card and address information, at 1014, the financial institution online payment system processor 106 may, at 1015, cause a financial institution message server (also referred to as "FI MS" in FIG. 1) processor send the user's card and address information via the card association processor 104 to the merchant website processor 102 at 1016. Responsive to receiving the user's card and address information, at 1017, the merchant website processor 102 may display a checkout confirmation page for the user with the user's card and address information filled in and continue to pre-existing payment processing channels or "business as usual" (also referred to as "BAU") at 1018.

Figure 2:
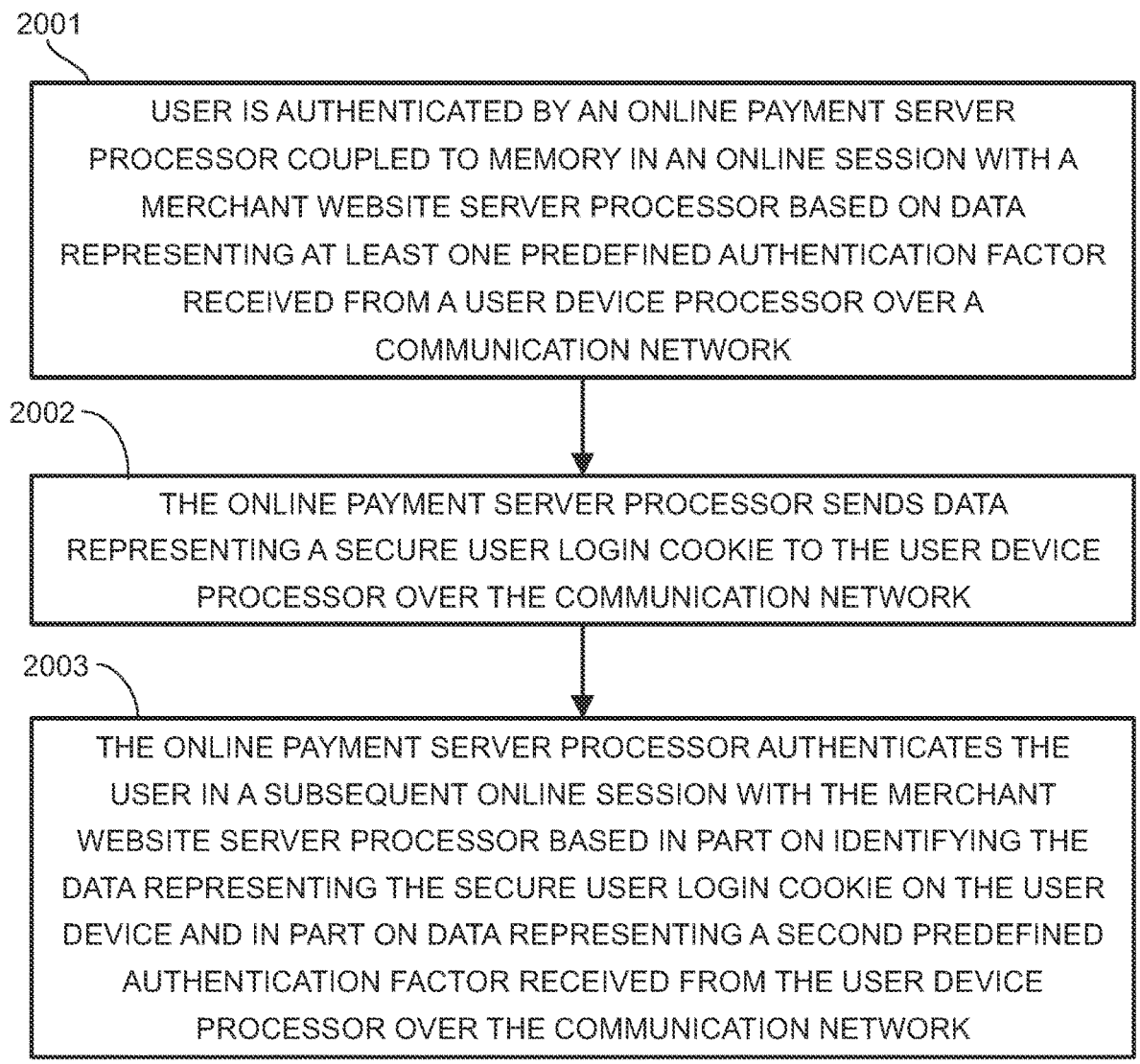
FIG. 2 is a flow chart that illustrates an overview example of a process for embodiments of the invention.

FIG. 2 is a flow chart that illustrates an overview example of a process for embodiments of the invention. Referring to FIG. 2, at 2001, an online payment server processor 106 coupled to memory may authenticate a user in an online session with a merchant website server processor 102 based on data representing at least one predefined authentication factor received from a user device processor 108 over a communication network. At 2002, the online payment server processor 106 may send data representing a secure user login cookie to the user device processor 108 over the communication network based on authentication of the user in said online session with the merchant web site server processor 102. Thereafter, at 2003, the online payment server processor 106 may authenticate the user in a subsequent online session with the merchant website server processor 102 based in part on identifying the data representing the secure user login cookie on the user device 102 and in part on data representing a second predefined authentication factor received from the user device processor 102 over the communication network.

Embodiments of the invention provide significant technological improvements over legacy systems, for example, in the sense that a pinned transaction on which security questions are based is time-bound and expires after a certain number of minutes, hours, days, or attempts. Further, the user's opting not to answer a security question based on a pinned transaction does not prevent the user from accessing a digital domain, but may instead increase fraud monitoring if the user attempts a high risk transaction after opting not to answer.

As noted, embodiments of the invention provide significant technological improvements over legacy systems, for example, by reducing the steps in checkout data flow and minimizing multi-function authentication interdiction data flow while increasing the security of checkout processing, for example, through biometrics. Such step reductions in checkout data flow thus simplify checkout data flow in a transaction originating on the web and ending on the web, while assuring secure authentication that is driven, for example, through biometrics. Moreover, it is to be noted that such implementation does not require any changes to existing merchant online processing infrastructure or card association processing infrastructure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C #, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

Aspects of the present invention may be described herein with reference to flowchart illustrations and/or block diagrams of methods, apparatus (systems), and computer program products according to embodiments of the invention. It will be understood that each block of such flowchart illustrations and/or block diagrams, and combinations of blocks in the flowchart illustrations and/or block diagrams, may be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   an online payment server processor coupled to memory and programmed to:
      send data representing a secure user login cookie to a user device processor over a communication network based on an authentication of the user device processor in an online session with a merchant website server processor;
      determine if the secure login cookie created in the first online session is associated with the user device during a subsequent online session;
      based on the determination that the secure user login cookie created in the first online session is associated with the user device in the subsequent online session, send a push notification to the user device processor comprising:
         instructions to the user device that cause the user device to launch a mobile payment application program on the user device; and
         instructions to the user device that cause the user device to display, after the mobile payment application program is launched, a prompt on the mobile payment application program for the user to enter an authorization via a second predefined authentication factor; and
      authenticate the user in the subsequent online session with the merchant website server processor based in part on identifying the data representing the secure user login cookie on the user device and in part on data representing the second predefined authentication factor.

2. The system of claim 1, wherein the authentication of the user is based on data representing at least one predefined authentication factor received from a user device processor over a communication network.

3. The system of claim 1, wherein the online payment server processor is further programmed to provide, to the user device processor during the first online session with the merchant website server processor, instructions to request a user input of a selection of an option that initiates a creation of a secure login cookie for a subsequent online session with the merchant website server processor.

4. The system of claim 1, wherein the online payment server processor is further programmed to receive, from a user input on the user device processor during the first online session with the merchant website server processor, the selection of the option that initiates the creation of the secure login cookie for the subsequent online session with the merchant web site server processor.

5. The system of claim 1, wherein the push notification further comprises instructions to the user device that cause the user device to populate the mobile payment application with checkout information associated with the subsequent online session.

6. The system of claim 1, wherein the online payment server processor is further programmed to authenticate the user in the online session with the merchant website server processor based on data representing the at least one predefined authentication factor comprising data representing at least one of a user identifier and a user password received from the user device processor over the communication network.

7. The system of claim 1, wherein the online payment server processor is further programmed to authenticate the user in the online session with the merchant website server processor based on data representing the at least one predefined authentication factor comprising both data representing a user identifier and data representing a user password received from the user device processor over the communication network.

8. The system of claim 1, wherein the online payment server processor is further programmed to send the data representing the secure login cookie to the user device processor when no data representing a secure user login cookie is already available on the user device processor.

9. The system of claim 8, wherein the online payment server processor is further programmed to send the data representing the secure login cookie to the user device processor when no data representing a secure user login cookie is already available on the user device and the mobile payment application program is present on the user device processor.

10. A method to authenticate users, comprising:
sending, by one or more computing devices, data representing a secure user login cookie to a user device processor over a communication network based on an authentication of the user device processor in an online session with a merchant website server processor;
determining, by the one or more computing devices, if the secure login cookie created in the first online session is associated with the user device during a subsequent online session;
based on the determination that the secure user login cookie created in the first online session is associated with the user device in the subsequent online session, sending, by the one or more computing devices, a push notification to the user device processor comprising:
instructions to the user device that cause the user device to launch a mobile payment application program on the user device; and
instructions to the user device that cause the user device to display, after the mobile payment application program is launched, a prompt on the mobile payment application program for the user to enter an authorization via a second predefined authentication factor; and
authenticating, by the one or more computing devices, the user in the subsequent online session with the merchant website server processor based in part on identifying the data representing the secure user login cookie on the user device and in part on data representing the second predefined authentication factor.

11. The method of claim 10, wherein the authentication of the user is based on data representing at least one predefined authentication factor received from a user device processor over a communication network.

12. The method of claim 10, further comprising providing, to the user device processor during the first online session with the merchant website server processor, instructions to request a user input of a selection of an option that initiates a creation of a secure login cookie for a subsequent online session with the merchant website server processor.

13. The method of claim 10, further comprising receive, from a user input on the user device processor during the first online session with the merchant website server processor, the selection of the option that initiates the creation of the secure login cookie for the subsequent online session with the merchant website server processor.

14. The method of claim 10, wherein the push notification further comprises instructions to the user device that cause the user device to populate the mobile payment application with checkout information associated with the subsequent online session.

15. The method of claim 10, further comprising authenticating the user in the online session with the merchant website server processor based on data representing the at least one predefined authentication factor comprising data representing at least one of a user identifier and a user password received from the user device processor over the communication network.

16. The method of claim 10, further comprising authenticating the user in the online session with the merchant website server processor based on data representing the at least one predefined authentication factor comprising both data representing a user identifier and data representing a user password received from the user device processor over the communication network.

17. The method of claim 10, further comprising sending the data representing the secure login cookie to the user device processor when no data representing a secure user login cookie is already available on the user device processor.

18. The method of claim 11, further comprising sending the data representing the secure login cookie to the user device processor when no data representing a secure user login cookie is already available on the user device and the mobile payment application program is present on the user device processor.

19. A computer program product, comprising:
a non-transitory computer-readable medium having computer-readable program instructions embodied thereon, the computer-readable program instructions comprising instructions to:
send data representing a secure user login cookie to a user device processor over a communication network based on an authentication of the user device processor in an online session with a merchant website server processor;

determine if the secure login cookie created in the first online session is associated with the user device during a subsequent online session;

based on the determination that the secure user login cookie created in the first online session is associated with the user device in the subsequent online session, send a push notification to the user device processor comprising:

instructions to the user device that cause the user device to launch a mobile payment application program on the user device; and instructions to the user device that cause the user device to display, after the mobile payment application program is launched, a prompt on the mobile payment application program for the user to enter an authorization via a second predefined authentication factor; and authenticate the user in the subsequent online session with the merchant website server processor based in part on identifying the data representing the secure user login cookie on the user device and in part on data representing the second predefined authentication factor.

20. The computer program product of claim 19, wherein the authentication of the user is based on data representing at least one predefined authentication factor received from a user device processor over a communication network.

* * * * *